United States Patent Office 3,551,153
Patented Dec. 29, 1970

3,551,153
PHOTOPOLYMERIZABLE COMPOSITIONS
COMPRISING A FERROCENE DYE
Walter Cooper and Jacque K. Lindsay, Rochester, N.Y.,
assignors to Eastman Kodak Company, Rochester, N.Y.,
a corporation of New Jersey
No Drawing. Filed Aug. 4, 1967, Ser. No. 658,339
Int. Cl. G03c 1/64, 1/68
U.S. Cl. 96—86                     26 Claims

ABSTRACT OF THE DISCLOSURE

A photosensitive composition of matter comprising a light sensitive ferrocene dye and a photopolymerizable olefin which can be either a vinyl monomer, or a prepolymer, or both.

The present invention relates to photosensitive compositions and elements. In one of its more specific aspects, the present invention relates to photosensitive compositions and elements which are particularly useful as the basis of an image forming system.

Since most photopolymerizable olefins are usually sensitive to radiation primarily in the ultraviolet and shorter wavelength regions of the spectrum, their utility in a photographic system is limited unless they are sensitized to visible radiation by the addition of light sensitive dyes. However, most photopolymerizable olefins so sensitized do not show an appreciable increase in photographic speed. It is, therefore, highly desirable to provide photopolymerizable compositions which are not only sensitive to visible radiation, but also show increased photographic speed.

It is, therefore, an object of this invention to provide a novel and useful photographic composition with greatly increased light sensitivity.

Another object of this invention is to provide a novel and useful image-forming composition.

Still another object of this invention is to provide a novel photographic composition wherein silver salts are not utilized.

Other objects of this invention will become apparent from the following description and claims.

These and other objects of this invention are accomplished with a photographic composition comprising a photopolymerizable olefin sensitized with a ferrocene dye having the formula:

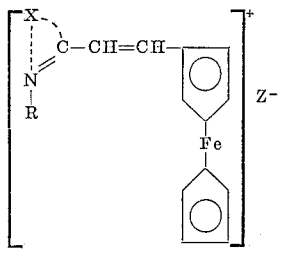

wherein X represents the non-metallic atoms required to complete a heterocyclic ring; R is an alkyl radical, and Z is an anion. A wide variety of ferrocene dyes having this formula can be employed. X can be any combination of non-metallic atoms sufficient to complete a substituted or unsubstituted heterocyclic ring containing from five to six atoms. Typical heterocyclic nuclei which X can represent include, for example, thiazole, benzothiazole, naphthothiazole, oxazole, benzoxazole, naphthoxazole, selenazole, benzoselenazole, naphthoselenazole, thiazoline, quinoline, pyridine, etc. A more complete listing of the various nuclei which X can represent appears in columns 3 and 4 of U.S. Pat. 3,128,179. R can be an alkyl, including substituted alkyl, radical up to 12 carbon atoms or higher. The lower membered radicals, e.g., methyl, ethyl, propyl, isopropyl, or butyl are preferred. The alkyl radical can be substituted, for example, with a carboxy group, halide, an amino group, a formyl group, etc. Z can be freely chosen from numerous negatively charged anions, for example, sulfonate, p-toluenesulfonate, fluoroborate, halide, etc. Specific examples of the ferrocene dyes include 3-methyl-2-ferrocenylidenemethyl-4,5-dihydrothiazolium iodide, 3-butyl-2-ferrocenylidene-methylbenzothiazolium - p - toluene sulfonate, 1,3,3-trimethyl-2-ferrocenylidenemethylbenzolium iodide, etc.

The ferrocene dyes of the invention are characterized by an unsaturated side chain having the formula:

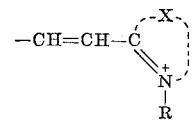

Such a side chain is a conjugated system that greatly contributes to the light sensitivity of the material. The unexpected utility of this dye in the photographic art is demonstrated below. When one of the ferrocene dyes described above is added to a photographic composition comprising a prepolymeric olefin and/or a vinyl monomer, the speed of image retention is remarkably increased. This increase in speed demonstrates the increased sensitization caused by the ferrocene dye on the other components of the photographic element. Photopolymeric olefins containing such dyes are therefore efficient image-forming compositions.

The photopolymerizable olefin is a composition which, upon exposure to light, forms a resinous substance which is insoluble in the same solvent which dissolved the original monomer. The photopolymerizable olefin can be either a vinyl monomer or a photopolymer of the prepolymer type. Examples of the vinyl monomer which can be utilized are acrylamide, acrylic acid, N,N'-methylenebis acrylamide, etc. The prepolymer is a partially polymerized composition capable of further polymerization because of its residual unsaturation. The prepolymer may contain vinyl or allyl groups. Examples of prepolymers which can be utilized are polyvinyl cinnamate, diallyl isophthalate, poly(vinylacetate-azidobenzoate), etc.

The invention can be performed by dissolving from ¼% by weight to 5% by weight ferrocene dye into a suitable polar solvent which contains either the vinyl monomer or the prepolymer or a combination of both. A wide variety of polar solvents can be utilized to dissolve and coat the ferrocene dyes on the photographic supports as well as to process the image-exposed photographic elements. Suitable solvents can be readily ascertained by one skilled in the art. Generally, such solvents are polar solvents such as lower alkanols like ethanol and methanol and lower alkyl ketones such as acetone. Likewise, water having an acidic pH can be suitably used as the solvent for coating and processing some of the subject ferrocene derivatives, particularly the ferrocene derivatives containing dialkylamino substituted phenyl radicals.

The ferrocene dye and polymerizable olefin are then coated on a suitable photographic support. Photographic supports which contain such materials as baryta dispersed in gelatin coated on paper can be utilized with the light sensitive ferrocene dyes. Other suitable photographic supports include paper, baryta coated paper, glass, cellulose acetate, polyesters such as poly(ethylene terephthalate), aluminum, etc. However, an aluminum support is preferred.

The polar solvent is thereafter removed by conventional drying methods to leave the composition substantially uniformly coated on the support. The resulting photographic element is imagewise exposed to radiation in the visible spectrum by means, for example, of a carbon arc lamp. The photographic element is then developed with a suitable developer solvent. The polar solvent which is used to dissolve and coat the composition onto the support is one such suitable developer. The solvent dissolves and removes the unexposed composition from the photographic support. However, the exposed composition on the support is no longer dissolved by the solvent and after washing with the developer a relief image forms on the support. It is unexpectedly found that the relief image is retained at a much sooner development stage when ferrocene dye is added to the photographic element. This result is possibly attributed to the catalytic action of the light sensitive ferrocene dye which promotes the polymerization of the photopolymerizable olefin into an insoluble cross-linked polymer. Image retention is found to be fastest when the photographic element is comprised of both a prepolymer and a vinyl monomer. The adsorption of the dye to the polymer or perhaps its inclusion in the polymer structure causes this improved result.

The preparation of one of the ferrocene derivatives, 3 - ethyl- 2 - ferrocenylidenemethylbenzothiazolium - p-toluene sulfonate, will now be described by way of example. The following procedure is conducted in the dark. A mixture of the following parts by weight:

| | Parts |
|---|---|
| Formyl ferrocene | 2.14 |
| 1 - ethyl - 2 - methylbenzothiazolium p - toluene sulfonate | 7.0 |
| Ethanol | 5.0 |
| Triethylamine | 2.0 | is heated at reflux for 30 minutes. The solvent is removed; the residue is boiled in 30 parts of acetone and filtered. The filtrate is poured into 300 parts of dry ether and the ether is then decanted. Again the oil residue is redissolved in 30 parts acetone, filtered and the filtrate slowly poured into 300 parts of dry ether. The solid is filtered and dried. If desired, the solid can be recrystallized from an ethanol-water mixture. The material crystallizes as deep blue lustrous plates as its monohydrate. It has a melting point of 148–150° C. Other ferrocene dyes having the above general formula can be prepared in a similar way by substituting the desired heterocyclic salt for the 1-ethyl-2-methyl benzothiazolium p-toluene sulfonate.

The following specific examples will serve to more fully explain the practice of my invention. However, it will be understood that these are only examples and in no way limiting of this invention.

EXAMPLE 1

A photographic support of aluminum is coated with a solution containing 10% by weight of poly(vinyl acetate-benzoate cinnamylidene acetate). The coated support is exposed 5 seconds per step of 0.3 neutral density step tablet to a carbon arc lamp at a distance of 7 inches. The exposed support is then developed in monochlorobenzene developer. The image of this control coating will hold at the 40 second exposure step.

A photographic support of aluminum is coated with a solution containing 10% by weight of poly(vinyl acetate-benzoate cinnamylidene acetate) and ½% by weight of the ferrocene dye. The coated supported is exposed 5 seconds per step of 0.3 neutral density step tablet to a carbon arc lamp at 7 inches. The exposed support is then developed in monochlorobenzene developer. The image will hold at the 15 second exposure step.

EXAMPLE 2

A photographic support of aluminum is coated with a solution containing 10% by weight poly(vinylacetate-benzoate cinnamyl acetate), 1% ferrocene dye and 2% N,N'-methylenebisacrylamide. After drying the supports are exposed 5 seconds to a carbon arc lamp at a distance of 5 inches. The exposed supports are then developed in monochlorobenzene. The image holds at the 5 second exposure step.

Other photopolymerizable compounds (diallyl isophthalate; poly(vinylacetateazidobenzoate); poly - 4 - dimethylamino - 5 - vinyl-2-stilbazolium methosulfate; and polyvinyl cinnamate) are also tested with the methylenebis acrylamide and a metallocene dye. Each test shows that the ferrocene dye greatly sensitizes the coatings. Without the ferrocene the image does not hold with such short exposures.

EXAMPLE 3

To 5 ml. of an aqueous solution of acrylamide monomer (30 g. of acrylamide monomer per 100 ml. of solution) is added 5 ml. of .01 M ethyl alcohol solution of the ferrocene dye derivative. The resultant solution is treated with nitrogen gas for 10 minutes, after which time it is imagewise exposed to monochromatic radiation at 405 m$\mu$ for 2 hours. To the irradiated solution is added 10 ml. of methyl alcohol, whereupon the polyacrylamide separates in the form of a fine white powder.

EXAMPLES 4 AND 5

The same test conducted in Example 3 is repeated using monochromatic radiation at 578 m$\mu$ and 640 m$\mu$, respectively. In both instances polyacrylamide separates out in the form of fine white powder.

EXAMPLE 6

The procedure as described in Example 3 above is repeated using bulk acrylic acid in place of the acrylamide monomer. A white polymeric material is formed on exposure of the sample to monochromatic radiation at 405 m$\mu$.

EXAMPLE 7

To a solution of 1.2 g. of acrylamide monomer and .02 g. of N,N'-methylenebis acrylamide in 2 ml. of water is added a 2 ml. portion of a $10^{-3}$ molar solution of the ferrocene dye in 50% ethyl alcohol. The resultant mixture is exposed to normal room light for 5 minutes and left at room temperature overnight. During this time a white gelatinous polymer precipitates from the solution. In addition the monomer solution changes from blue-green to dark red.

The above Examples 3–7 demonstrate that ferrocene dye catalyzes polymerization of olefinic compositions.

Although the invention has been described in considerable detail with particular reference to preferred embodiments thereof, variations and modifications can be effected within the spirit and scope of the invention as described hereinbefore and as defined in the appended claims.

We claim:

1. A composition of matter comprising an ethylenically unsaturated photopolymerizable compound sensitized with a ferrocene dye, said dye having the formula:

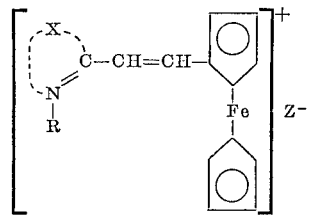

wherein X represents the non-metallic atoms required to complete a heterocyclic nucleus selected from the group consisting of thiazole, benzothiazole, naphthothiazole, oxazole, benzoxazole, naphthoxazole, selenazole, benzoselenazole, naphthoselenazole, thiazoline, quinoline and pyridine, R is an alkyl radical, and Z is an anion.

2. A composition of matter as described in claim 1 wherein the ferrocene dye is 3-ethyl-2-ferrocenylidene-methylbenzothiazolium p-toluene sulfonate.

3. A composition of matter as described in claim 1 wherein the photopolymerizable compound is a vinyl monomer.

4. A composition of matter as described in claim 3 wherein the vinyl monomer is acrylamide.

5. A composition of matter as described in claim 3 wherein the vinyl monomer is acrylic acid.

6. A composition of matter as described in claim 3 wherein the vinyl monomer comprises acrylamide and N,N'-methylenebis acrylamide.

7. A composition of matter as described in claim 1 wherein the photopolymerizable compound is a prepolymer.

8. A composition of matter as described in claim 7 wherein the prepolymer is poly(vinylacetatebenzoate cinnamylidene acetate).

9. A composition of matter as described in claim 1 wherein the photopolymerizable compound comprises a vinyl monomer and a prepolymer.

10. A composition of matter as described in claim 9 wherein the vinyl monomer is N,N'-methylenebis acrylamide.

11. A composition of matter as described in claim 9 wherein the prepolymer is poly(vinylacetatebenzoate cinnamylidene acetate).

12. A composition of matter as described in claim 9 wherein the prepolymer is poly(vinylacetate-azidobenzoate).

13. A composition of matter as described in claim 9 wherein the prepolymer is poly-4'-dimethylamino-5-vinyl-2-stilbazolium methosulfate.

14. A composition of matter as described in claim 9 wherein the prepolymer is polyvinyl cinnamate.

15. A composition of matter as described in claim 9 wherein the prepolymer is a polymer of diallyl isophthalate.

16. A composition of matter as described in claim 9 wherein the prepolymer is polyvinylazidophthalate-vinyl acetate.

17. A composition of matter as described in claim 1 wherein X in said formula represents the non-metallic atoms necessary to complete a benzothiazole nucleus.

18. A photographic element comprising a support having coated thereon an ethylenically unsaturated photopolymerizable compound sensitized with a ferrocene dye, said dye having the formula:

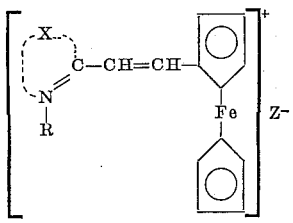

wherein X represents the non-metallic atoms required to complete a heterocyclic nucleus selected from the group consisting of thiazole, benzothiazole, naphthothiazole, oxazole, benzoxazole, naphthoxazole, selenazole, benzoselenazole, naphthoselenazole, thiazoline, quinoline and pyridine, R is an alkyl radical and Z is an anion.

19. A photographic element as described in claim 18 wherein the ferrocene dye is 3-ethyl-2-ferrocenylidenemethylbenzothiazolium p-toluene sulfonate.

20. A photographic element as described in claim 18 wherein the photopolymerizable compound is a vinyl monomer.

21. A photographic element as described in claim 20 wherein the vinyl monomer is N,N'-methylenebis acrylamide.

22. A photographic element as described in claim 18 wherein the photopolymerizable compound is a prepolymer.

23. A photographic element as described in claim 22 wherein the prepolymer is poly(vinylacetatebenzoate cinnamylidene acetate).

24. A photographic element as described in claim 18 wherein X in said formula represents the non-metallic atoms necessary to complete a benzothiazole nucleus.

25. A photographic element comprising a support having coated thereon an ethylenically unsaturated photopolymerizable compound selected from the group consisting of poly(vinylacetatebenzoate cinnamyl acetate), a polymer of diallyl isophthalate, poly(vinylacetateazidobenzoate), poly - 4 - dimethylamino-5-vinyl-2-stilbazolium methosulfate and poly(vinylcinnamate), said compound sensitized with a ferrocene dye having the formula:

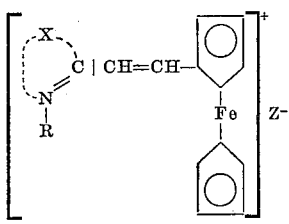

wherein X represents the non-metallic atoms required to complete a benzothiazole nucleus, R is an alkyl radical and Z is an anion.

26. A photographic element comprising an aluminum support having coated thereon 10 parts per weight of poly-(vinylacetatebenzoate cinnamylidene acetate), 2 parts per weight of N,N'-methylenebis acrylamide, and 1 part 3-ethyl-2-ferrocenylidenemethylbenzothiazolium p - toluene sulfonate.

References Cited
UNITED STATES PATENTS 3,335,008    8/1967    Dubose _____ 96—92

FOREIGN PATENTS 1,466,079    12/1966    France _____ 96—92

RONALD H. SMITH, Primary Examiner

U.S. Cl. X.R.
96—91, 92, 75, 115